United States Patent
Diwakar et al.

(10) Patent No.: US 8,370,472 B2
(45) Date of Patent: Feb. 5, 2013

(54) SYSTEM AND METHOD FOR EFFICIENT MACHINE SELECTION FOR JOB PROVISIONING

(75) Inventors: Kiran Prakash Diwakar, Maharashtra (IN); Sumeet Mathur, Andhra Pradesh (IN)

(73) Assignee: CA, Inc., Islandia, NY (US)

( * ) Notice: Subject to any disclaimer, the term of this patent is extended or adjusted under 35 U.S.C. 154(b) by 872 days.

(21) Appl. No.: 12/203,045

(22) Filed: Sep. 2, 2008

(65) Prior Publication Data

US 2010/0058349 A1 Mar. 4, 2010

(51) Int. Cl.
*G06F 15/16* (2006.01)
(52) U.S. Cl. .................. 709/223; 709/224; 709/226
(58) Field of Classification Search .................. 709/201, 709/223–226; 718/100–105
See application file for complete search history.

(56) References Cited

U.S. PATENT DOCUMENTS

| | | | | |
|---|---|---|---|---|
| 6,314,447 B1 * | 11/2001 | Lea et al. | ...... | 718/105 |
| 7,340,598 B2 | 3/2008 | Esfahany | ...... | 713/100 |
| 2004/0010544 A1 * | 1/2004 | Slater et al. | ...... | 709/203 |

OTHER PUBLICATIONS

U.S. Appl. No. 12/103,155; Title: System and Method for Generating a Unified Service Model; Inventors Goodman et al., filed Apr. 15, 2008.
U.S. Appl. No. 12/203,018; Title: System and Method for Dynamic Resource Provisioning for Job Placement; Inventors Esfahany et al., filed Sep. 2, 2008.

* cited by examiner

*Primary Examiner* — Djenane Bayard
(74) *Attorney, Agent, or Firm* — Baker Botts L.L.P.

(57) ABSTRACT

A method for efficient machine selection for job provisioning includes receiving a job request to perform a job using an unspecified server machine and determining one or more job criteria needed to perform the job from the job request. The method further includes providing a list of one or more server machines potentially operable to perform the job. For each server machine on the list of one or more server machines, a utilization value, one or more job criteria satisfaction values, and an overall suitability value are determined. The overall suitability value for each server machine is determined from the one or more job criteria satisfaction values and the utilization value, and may include a numeric degree to which each server machine is suitable for performing the job. Furthermore, the overall suitability value for each server machine may be included on a list of one or more overall suitability values.

16 Claims, 2 Drawing Sheets

SYSTEM AND METHOD FOR EFFICIENT MACHINE SELECTION FOR JOB PROVISIONING

TECHNICAL FIELD

The present disclosure relates generally to computer resource management and more particularly to a system and method for efficient machine selection for job provisioning.

BACKGROUND

Reliability and speed of processing activities has become increasingly important, particularly in computer systems containing a large number of server machines where multiple users may require system resources to perform various processing activities. These processing activities may compete with one another for system resources. Overloading a server machine in a computer system with too many processing activities may cause the server machine to operate poorly or crash. Accordingly, the ability to distribute processing activities intelligently within a set of server machines may increase overall operational efficiency.

SUMMARY

The present disclosure relates generally to a system and method for efficient machine selection for job provisioning. Accordingly, in particular embodiments, a method for efficient machine selection for job provisioning includes receiving a job request to perform a job using an unspecified server machine and determining one or more job criteria needed to perform the job from the job request. The method further includes providing a list of one or more server machines that are potentially operable to perform the job. For each server machine on the list of one or more server machines, a utilization value, one or more job criteria satisfaction values, and an overall suitability value are determined. The utilization value may include a numeric level of activity for each server machine while each of the one or more job criteria satisfaction values may include a numeric degree to which each server machine satisfies one of the one or more job criteria. The overall suitability value for each server machine may be determined from the one or more job criteria satisfaction values and the utilization value and may include a numeric degree to which each server machine is suitable for performing the job. Furthermore, the overall suitability value for each server machine may be included on a list of one or more overall suitability values and a most suitable server machine for performing the job may be determined from the list of one or more overall suitability values.

In particular embodiments, the method may further include forwarding the job to the most suitable server machine.

In particular embodiments, the step of determining a most suitable server machine for performing the job from the list of one or more overall suitability values may include identifying a server machine having a highest suitability value on the list of suitability values.

In particular embodiments, the step of determining an overall suitability value from the one or more job criteria satisfaction values and the utilization value may include entering the one or more job criteria satisfaction values and the utilization value for each server machine into a performance equation wherein the result of the performance equation may be the overall suitability value for each server machine.

In particular embodiments, the one or more job criteria may include, for example, a type of software needed to perform the job, a threshold amount of system resources needed to perform the job, and an amount of time for which the threshold amount of system resources are needed to perform the job.

In particular embodiments, the step of determining one or more job criteria satisfaction values may include determining a software compatibility value, a server machine availability value, and a system resource compatibility value for each server machine. The software compatibility value may include a numeric degree of compatibility between a type of software included on each server machine and the type of software needed to perform the job. The server machine availability value may include a numeric degree to which each server machine has the threshold amount of system resources available to perform the job for the amount of time needed to perform the job, and the system resource compatibility value may include a numeric degree of compatibility between available system resources on each server machine and the threshold amount of system resources needed to perform the job.

In particular embodiments, the performance equation (referenced above) may include one or more weighted arguments, each of which may correspond to one of the one or more job criteria satisfaction values and the utilization value. Furthermore, a user may be enabled to specify a weighted value for each of the one or more weighted arguments wherein the weighted value determines a mathematical weight for the each of the one or more weighted arguments.

In particular embodiments, the performance equation may be expressed as (overall suitability value)=$w*$(utilization value)+$x*$(software compatibility value)+$y*$(server machine availability value)+$z*$(system resource compatibility value) where $w$, $x$, $y$, and $z$ are weighted values.

In particular embodiments, at least one of the one or more of the job criteria are specified by a user.

In particular embodiments, the utilization value may be extrapolated from historical usage data from the each server machine to determine an estimated level of activity at a future point in time.

Technical advantages of particular embodiments of the present disclosure may include enabling a computer system to quantifiably measure the operational characteristics of a server machine against a desired set of operational characteristics (e.g., job criteria) needed to perform a job to determine whether the operational characteristics of the server machine satisfy the job criteria needed to perform the job. The degree to which the operation characteristics of the server machine satisfy the job criteria for the job may be quantifiably expressed as a set of numeric satisfaction values. Further embodiments of the present disclosure may provide the additional advantage of enabling the computer system to monitor the activity level of the server machine and to factor the activity level of the server machine into the assessment of whether the machine is suitable for performing the job in light of its operational characteristics as well as its current usage level. The level of activity of the server machine may be quantifiably expressed as a numeric utilization value. Furthermore, particular embodiments of the present disclosure may employ a performance equation to aggregate the satisfaction values as well as the utilization value into a single overall suitability value that may indicate an overall degree of suitability of the server machine for performing the job, yet another technical advantage. In particular embodiments, one or more terms in the performance equation may be associated with a user-specified weighted value that may enable a user to determine the relative mathematical weight of each of the satisfaction values as well as the utilization value to the overall suitability value, thus providing the further technical advantage of enabling a user to emphasize the relative importance of various qualities of the "best" server machine in determining the suitability of the resource for performing the job. The particular embodiments of the present disclosure may enable an organization to reduce its need for "new" server machines by enabling the organization to optimally or more efficiently employ is existing server machines.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following descriptions, taken in conjunction with the accompanying drawings, in which.

DETAILED DESCRIPTION OF EXAMPLE EMBODIMENTS

When a job (e.g., a computing operation) is submitted to a computer system for execution, the computer system may have several parallel resources (e.g., server machines) available to perform the job. However, not every one of the available server machines may be appropriate or even suitable for performing the job. For example, some of the available server machines may not be adequately provisioned to perform the job while others may be too busy to perform the job in spite of being adequately provisioned.

In cases where multiple server machines are available to perform a job, it may be desirable to consider the appropriateness of each available server machine for performing the job prior to assigning the job so that the best server machine for performing the job may be identified. This process may be especially beneficial in the context of data centers that may have hundreds or even thousands of server machine from which to choose. To identify the best server machine available for a job, the computer system may monitor the utilization of the available server machines on an approximately real-time basis and/or on a historical basis to determine usage trends and identify a best server machine for handling each new job as each new job is submitted. This process of dynamically identifying the best available resource for performing a job may help to balance workload across the computer system, likely increasing reliability and efficiency of the plurality of server machines included in the computer system.

In the realm of job provisioning, many industry solutions may expect a "clean" (possibly bare-metal) server machine to be available for provisioning in order to alleviate a "critical" situation, such as an overflow of work, in a given setup configuration. Thus, many solutions expect a "free pool" of server machines to be available from which a clean server machine may be brought online when needed.

However, it may not be feasible to expect "clean" server machine (e.g., a server machine having nothing installed on it) at any given time in any given environment. A more likely scenario is that several server machines may exist that are not really "clean," that is, they may have some software/applications installed, but at the same time, such server machines may be underutilized. In such a case, these underutilized server machines may be used to perform surplus jobs in lieu of employing additional "clean" server machines to handle the load.

When provisioning underutilized server machines to perform a job (e.g., to alleviate a problem scenario such as an overflow of work), it may be desirable to find the best possible server machine (e.g., the most suitable server machine) to perform the job. One approach for identifying the most suitable server machine for performing a job may take into account factors such as: current performance metrics, machine availability, software compatibility, and utilization thresholds.

For example, whenever a computer system detects overutilization of one or more of the server machines (e.g., servers) in its available pool of resources and hence subsequently a possibility of system breakdown or violation of a service level agreement ("SLA"), the computer system may try to find a server machine that can share the load of the existing setup and thereby alleviate the problem scenario. This endeavor may entail finding the "best" (e.g., most suitable) server machine in the available pool. If a clean server machine is available, it may be directly provisioned. However, as mentioned above, this may not always be the case. Hence it may be beneficial to identify a "best" (e.g., most suitable) server machine from an existing pool of server machines that may already be in use for some other tasks but which is nonetheless capable of handling additional workload (e.g., performing the additional job).

Figure 1:
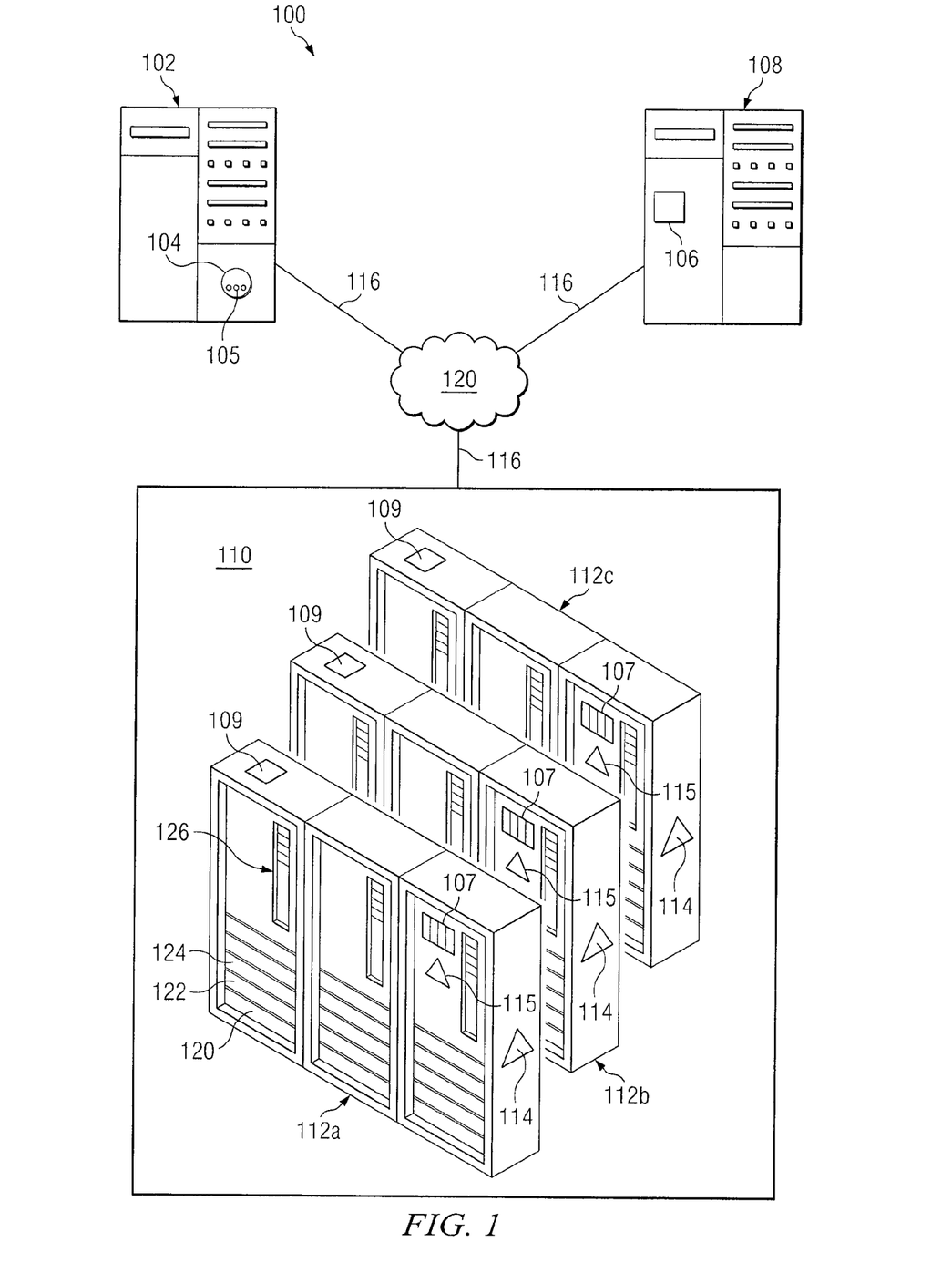
FIG. 1 illustrates an example system for efficient machine selection for job provisioning according to an example embodiment of the present disclosure.

FIG. 1 illustrates an example system 100 for efficient machine selection for job provisioning according to an example embodiment of the present disclosure. System 100 generally includes a client machine 102 operable to submit a job request to a server machine 108, which includes a resource brokering engine 106, for job 104. Brokering engine 106 may monitor an active pool 110 of server machines 112 and identify the most suitable server machine 112 available in active pool 110 for performing job 104 based on one or more utilization metrics 114 received from the server machines 112 in active pool 110 and also one or more job criteria 105 associated with job 104 (e.g., particular hardware, software, and availability requirements). Once brokering engine has identified the most suitable server machine 112, brokering engine 106 may forward job 104 to that server machine for execution.

The components of system 100 (e.g., client machine 102, server machine 108, and server machines 112) may be coupled to each other through a network 120 via one or more links 116. In particular embodiments, links 116 may each include one or more wireline, wireless, or optical links. In particular embodiments, one or more links 116 each include a local area network ("LAN"), a wireless local area network ("WLAN"), a wide area network ("WAN"), a metropolitan area network ("MAN"), a portion of the Internet, or another link 116 or a combination of two or more such links 116. Each of the components coupled to network 120 communicate with each other via use of network 120.

In particular embodiments, network 120 may include one or more LANs, WLANs, WANs, MANs, a portion of the Internet, or another form of network or a combination of two or more such networks. The present disclosure contemplates any suitable network 120 or combination of networks 120. In particular embodiments, components of system 100 may be distributed across multiple cities or geographical regions connected by network 120. In particular embodiments, network 120 may be represented by multiple distinct, but interconnected networks that share components or distinctly contain similar components.

Once interconnected, the components of system 100 may work in conjunction with one another to provide computing services to an individual, company, or other organizational entity. One of ordinary skill in the art will appreciate that the above-described architecture of system 100 was presented for the sake of explanatory simplicity and will further appreciate that the components of system 100 may vary in number and arrangement without departing from the scope of the present disclosure.

In a typical scenario, the server machines 112 in active pool 110 may receive and perform jobs 104 from one or more client machines 102. A job 104 may be any computing-based task submitted by client machine 102 (or other suitable source) to active pool 110 for execution. As an example and not by way of limitation, a job 104 may include an operation or a batch of operations to be performed by a single instance of a computer program residing on one of server machines 112. For instance, job 104 may be a batch of payroll accounts to be tabulated at the end of a payroll period for employees of a company using the company's payroll program.

Client machine 102 may submit a job 104 to active pool 110 for execution for any number of reasons such as, for example, because client machine 102 lacks the proper software to perform job 104 or because client machine 102 does not have enough processing power to complete job 104 in a timely manner. In any case, active pool 110 may serve as repository of available server machines 112 that are currently provisioned and available to perform computing-based operations (e.g., jobs 104) on behalf of client machines 102. For example, active pool 110 may consist of a collection of servers. In another embodiment, client machine 102 may be a server machine 112 in active pool 110 that is overloaded but is tasked with performing job 104 despite its workload. Thus, client machine 102 may submit job 104 to brokering engine 106 to be redistributed to another more suitable server machine 112 in active pool 110. Additionally, in particular embodiments, server machine 108 may reside within active pool 110 and may be considered a special type of server machine 112 distinguished by the fact that it serves as a host for brokering engine 106. In any case, active pool 110 may define the group of server machines 112 considered by brokering engine 106 when distributing job 104.

Client machine 102 may be any component of hardware or software or combination of two or more such components operable to submit a job 104 to active pool 110 for execution. As an example and not by way of limitation, client machine 102 may be considered a special type of server machine 112 distinguished by the fact that it acts as the source of job 104. Typically, client machine 102 resides outside of active pool 110; however, in particular embodiments, client machine 102 may be among the server machines 112 included in active pool 110.

Client machine 102 may include an interface 120, one or more processors 122, and a memory 124 comprising or capable of receiving logical program instructions recorded on a tangible computer readable media 126 (e.g., a cd-rom, a flash drive, a floppy disk, etc.). In particular embodiments, a user may interact with a client machine 102 either directly or indirectly via any suitable input device(s) (e.g., a keyboard or a mouse) and output device(s) (e.g., a monitor) connected either directly or indirectly to client machine 102. Example embodiments of client machine 102 may include a personal computer, a laptop, a personal digital assistant, or other processor-controlled device capable of submitting a job 104 to active pool 110.

In particular embodiments, when client machine 102 submits a job to active pool 110 for execution, client machine 102 may be indifferent as to the particular server machine 112 that will ultimately perform job 104. Accordingly, in particular embodiments, client machine 102 may use a brokering engine 106 to select the most suitable server machine 112 available in active pool 110 for performing job 104. Brokering engine 106 may be any component of hardware or software or combination of two or more such components capable of analyzing one or more job criteria 105 associated with job 104 as well as utilization statistics 114 (e.g., current utilization statistics or utilization statistics determined from historical data) obtained from the server machines 112 in active pool 110 to determine the most suitable server machine 112 available to perform job 104. As an example and not by way of limitation, brokering engine 106 may be a software program that logically resides between client machine 102 and active pool 110. As an additional example and not by way of limitation, brokering engine 106 may be a software program that resides on client machine 102 or on a server machine 112 in active pool 110. In any case, when a job 104 is received from client machine 102, brokering engine 106 may identify the most suitable server machine 112 available to perform job 104 to client machine 102, and client machine 102 may forward the job 104 to the most suitable server machine 112 in active pool 110 for execution based on the determination of brokering engine 106.

A server machine 112 may be any processor-controlled device or combination of two or more such devices capable of executing a computing operation (e.g., a job 104). As an example and not by way of limitation, a server machine 112 may be a host computer, workstation, personal computer, web server, file server, or other server. In particular embodiments, a server machine 112 may include an interface 120, one or more processors 122, and a memory 124 comprising or capable of receiving logical program instructions recorded on a tangible computer readable media 126 (e.g., a cd-rom, a flash drive, a floppy disk, etc.). In particular embodiments, a user may interact with a server machine 112 either directly or indirectly via any suitable input device(s) (e.g., a keyboard or a mouse) and output device(s) (e.g., a monitor) connected either directly or indirectly to server machine 112.

Processor 122 may refer to any suitable device operable to execute instructions and manipulate data to perform operations for server machines 112. Processor 122 may include, for example, any type of central processing unit (CPU). Memory 124 may be any form of volatile or non-volatile memory including, without limitation, magnetic media, optical media, random access memory (RAM), read-only memory (ROM), removable media, or any other suitable local or remote memory component. Interface 120 may comprise any hardware, software, or encoded logic operable to send and receive information to and from other components of system 100 such as client machine 102, server machine 108, or other server machines 112.

In particular embodiments, a server machine 112 may include any number and type of software applications such as one or more operating systems (e.g., MS-DOS, PC-DOS, MAC-OS, WINDOWS, UNIX, or other suitable operating system), database applications (e.g. MICROSOFT EXCEL, MICROSOFT ACCESS), word processing applications (e.g., MICROSOFT WORD), proprietary applications, or other suitable software applications, one or more of which may be suitable for performing job 104.

When a server machine 112 performs a computer-based operation (e.g., a job 104), various system resources of the server machine 112 (e.g., processor capacity, memory capacity, etc.) may be devoted to performing that computer-based operation. Thus, the amount of system resources that a server machine 112 has available at a given moment in time may limit the number of jobs 104 that the server machine 112 may perform before reaching its operational capacity (e.g., the point at which one or more system resources reach maximum capacity). Moreover, as the usage of a server machine 112 reaches its operational capacity, the performance of server machine 112 may decline. For example, server machine 112 may run slower as it nears its operational capacity. Furthermore, server machine 112 may crash or exhibit other problems if the usage of server machine 112 exceeds its operational capacity.

To determine the best server machine 112 available to perform a job 104, brokering engine 106, upon receiving a job request from client machine 102, may determine one or more job criteria 105 associated with job 104 that may define a set of operational characteristics needed for a server machine 112 to be suitable for executing job 104. Once brokering engine 106 has compiled the list of job criteria 105 needed to perform job 104, brokering engine 106 may apply each of job criteria 105 to each server machine 112 in active pool 110 to determine a degree to which each server machine 112 satisfies each job criteria 105.

As brokering engine 106 applies each job criteria 105 to each server machine 112 in active pool 110, brokering engine 112 may compile a set of satisfaction values 107 for each server machine 112. As explained in more detail below, each satisfaction value 107 may indicate a numeric degree to which the operational characteristics of each server machine 112 in active pool 110 satisfy each of the job criteria 105 for job 104. In addition to compiling a list of satisfaction values 107 for each server machine 112, brokering engine 106 may also determine a utilization value 115 for each server machine 112. Utilization value 115 may indicate a numeric level of activity of each server machine 112.

After determining a set of satisfaction values 107 and a utilization value 115 for each server machine 112, brokering engine 106 may then enter the satisfaction values 107 and the utilization value 115 for each server machine 112 into a performance equation which may yield a single overall suitability value 109 for each server machine 112. An overall suitability value 109 may indicate a numeric degree to which a server machine 112 is suitable for performing job 104, for example, in light of its operational characteristics and usage level. Brokering engine 106 may compile a list of the overall suitability values 109 for the server machines 112 in active pool 110, each server each server machine 112 corresponding to one of the overall suitability values on the list, and may identify the most suitable server machine 112 for performing job 104 from the list of overall suitability values 109, for example, by identifying the server machine 112 having the highest overall suitability value 109. After brokering engine 106 has identified the best server machine 112 to client machine 102, brokering agent 106 may provision that server machine 112 to perform job 104 and client machine 102 may forward job 104 to that server machine 112 for execution.

A job criteria 105 may be any desired operational characteristic of a server machine 112 needed for server machine 112 to satisfactorily perform job 104. As an example and not by way of limitation, job criteria 105 may include, software characteristics such as a desired type or version of software (e.g., a particular operating system), hardware characteristics and thresholds (e.g., a desired type of processor, a desired processor speed, a desired amount of RAM, a desired amount of hard drive space, a total amount of physical memory, a total amount of SWAP, an amount of available physical memory, and amount of available SWAP), and availability requirements such as a minimum amount of time over which a server machine 112 must devote the needed system resources to job 104.

In particular embodiments, one or more job criteria 105 may be predicated on required operational characteristics, without which, a server machine 112 cannot perform job 104. In particular embodiments, one or more job criteria 105 may be predicated on preferred operational characteristics that are not necessary to perform job 104, but which are preferred for one reason or another. In any case, brokering engine 106 may use job criteria 105 to determine which server machines 112 in active pool 110 have the most acceptable operating characteristics for performing job 104.

In particular embodiments, the degree to which a server machine 112 (e.g., an operational characteristic of server machine 112) satisfies a job criteria 105 may be expressed as a single numeric satisfaction value 107. For example, in particular embodiments, job criteria 105 may include one or more software requirements, one or more system resource requirements, and an availability requirement. Accordingly, brokering engine 106 may apply these job criteria 105 to a server machine 112 and may determine a software compatibility value, a system resource compatibility value, and a server machine availability value for server machine 112.

A software compatibility value may represent numeric degree of compatibility between the software included on a server machine 112 and the software needed to perform job 104. To determine the software compatibility value, brokering engine 106 may consult a table of compatibility values which reflect a degree of compatibility between different types and versions of software. Thus, using the compatibility table, brokering engine 106 may compare the type of software needed to perform job 104 with the type of software resident on server machine 112 and determine a software compatibility value. To determine the type of software resident on a server machine 112, brokering engine may use, for example, a software determination program such as CA COHESION APPLICATION CONFIGURATION MANAGER r4.5 produced by CA, Inc. One of ordinary skill in the art will appreciate that any suitable program of method may be used to determine the software resident on server machine 112.

In an example situation, if the type of software needed for job 104 and the type of software resident on server machine 112 are fully compatible, the software compatibility value may be a "1." By contrast if the type of software needed for job 104 and the type of software resident on server machine 112 are completely incompatible, the software compatibility value may be a "0." Furthermore, if the type of software needed for job 104 and the type of software resident on server machine 112 are largely compatible, the compatibility value may be an "0.8." Though the present example was explained on a relative scale of 0 to 1, one of ordinary skill in the art will appreciate that any suitable scale may be used. Depending upon the design of system 100, the table of compatibility values could be supplied, for example, by a user (or company) and created according to user-defined compatibility criteria. One of ordinary skill in the art will further appreciate that the software compatibility value may be determined using any suitable method for determining a degree of compatibility between various types and versions of software. Thus, brokering engine 106 may determine, for example, whether new software, required to be provisioned on an underutilized server machine 112 to perform job 104, can co-exist with the software already installed on server machine 112. Depending upon design, brokering engine 106 may make use of a knowledge base to determine software compatibility and may make intelligent decisions based on this knowledge base.

A system resource compatibility value may represent a numeric degree of compatibility between the available system resources on server machine 112 and the threshold amount of system resources needed to perform job 104. For example, a particular job may need a server machine 112 having at least 2 Giga Bytes ("GB") of RAM and a 2.4 Giga hertz ("GHz") CPU. To determine the system resource compatibility value, brokering engine 106 may determine the type and amount of system resources available on server machine 112 and compare them with the type and amount of threshold amount of system resources needed to perform job 104. Brokering engine may then calculate a degree of compatibility between the type and amount of resources needed for job 104 and the type and amount of resources available on server machine 112. In particular embodiments, the system resource compatibility value may be either a "1" indicating that the threshold amount and type of system resources needed for job 104 are fully met or exceeded by the amount and type of system resources available on server machine 112 or a "0" indicating that the type and amount of system resources needed for job 104 are not available on server machine 112 (e.g., if job 104 requires a 2 GHz processor and server machine 112 has a 1 GHz processor available). In another example embodiment, the system resource compatibility value may be a relative value between "0" and "1" that indicates a level of discrepancy between the type and amount of system resources available at server machine 112 and the threshold the type and amount of system resources needed for job 104. Though the present example was explained on a relative scale of 0 to 1, one of ordinary skill in the art will appreciate that any suitable scale may be used. One of ordinary skill in the art will further appreciate that the system resource compatibility value may be determined using any suitable method (e.g., mathematical formula) for determining a degree of compatibility between the system resources needed to perform job 104 and the system resource available at server machine 112.

A server machine availability value may represent a numeric degree to which a server machine 112 has a threshold amount of system resources available to perform job 104 for a specified amount of time needed to perform job 104. This parameter may determine the amount of time and actual timings when a given server machine 112 is available to perform job 104. For example, brokering engine 106 may determine that job 104 requires at least 1.5 GB of RAM to be available for 2 hours in order for server machine 112 to perform job 104. Accordingly, brokering engine 106 may apply this criteria 105 to each server machine 112 to determine the degree to which each server machine 112 will be able to supply the specified amount of resources for the specified amount of time.

In particular situations, the level of resource usage of a server machine 112 may predictably increase and decrease due to various factors. For example, server machine 112 may go through peak periods of use where a high percentage of its system resources (e.g., 65-85%) are constantly being used. Such a situation may occur, for example, if server machine 112 is acting as a web server during peak times of internet use. At other times, server machine 112 may go through minimal periods of use where a low percentage of its system resources (e.g., 10-15%) are being used, such as for example, during off-peak hours of use. Additionally, server machine 112 may be scheduled to perform various activities at certain times (e.g., regular virus scans or individually scheduled jobs) that will require a particular amount of system resources from server machine 112 when executed. In particular embodiments, server machine 112 may be aware of its use trends (e.g., peak periods of use and minimal periods of use) as well as its future activities and may use such data to estimate (e.g., extrapolate) an amount of system resources that it will likely have available at particular times of the day as well as a duration of time for which that amount of resources will be available. Thus, when a job 104 is submitted to broker engine 106, it may include an amount of time required for resource 112 to perform job 104 as well as a time period during which job 104 should be run.

To determine the server machine availability value, brokering engine 106 may query each server machine 112 with the threshold amount system resources needed for job 104 as well as the amount of time over which such system resources will be needed. In an example situation, if the server machine 112 responds that it can devote the threshold amount of system resources to job 104 for the required amount of time (e.g., at some point during a specified period for execution), brokering engine may calculate a value of "1" for the resource availability value. Alternatively, if the server machine 112 responds that it can only devote the threshold amount of system resources to job 104 for a portion of the required amount of time, brokering engine 106 may calculate a value between "0" and "1" that indicates a level of discrepancy between the available amount of time at server machine 112 and the required amount of time for job 104. For example, the server machine availability value could be a ratio between the time available at server machine 112 and the time required for job 104. In another example embodiment, the server machine availability value may be either a "1" indicating that server machine 112 can devote the needed amount of system resources to job 104 for the required amount of time, or a "0" indicating that server machine 112 cannot devote the needed amount of system resources to job 104 for the required amount of time. Though the present example was explained on a relative scale of 0 to 1, one of ordinary skill in the are will appreciate that any suitable scale may be used.

Depending upon the design of system 100, the job criteria 105 associated with a job 104 may be specified by a user, derived by brokering engine 106 from the characteristics of job 104, or both. As an example and not by way of limitation, when a user submits a job 104 to brokering engine 106 using client machine 102, the user may specify that the job 104 requires a certain type of software and a certain amount of free memory. As an additional example and not by way of limitation, when brokering engine 106 receives the request to determine the best server machine 112, brokering engine 106 may determine that job 104 will require a particular amount of time for execution. Accordingly, brokering engine 106 may combine the job criteria 105 that it received from the user with the job criteria 105 that it derived from the characteristics of job 104 to create a complete list of job criteria 105.

In addition to comparing the operational characteristics of each server machine 112 in active pool 110 against the job criteria 105 needed to perform job 104, brokering engine 106 may also analyze one or more utilization statistics 114 for each server machine 112 in active pool 110 to determine which server machine 112 is carrying the least load. The usage of server machine 112 (e.g., the activity level of device 112) may be monitored, for example, using one or more utilization metrics 114 gathered from server machine 112. For example, the utilization metrics 114 may be regularly gathered by a collection agent residing on each server machine 112 and delivered to brokering engine 106 at regular intervals (e.g., every 30 seconds). Utilization metrics 114 may include any indicator(s) suitable for indicating the amount of system resources that a server machine 112 has available to perform a job 104. For example, a utilization metric 114 may be a single numeric value that represents a particular type and level of system resource usage currently taking place at server machine 112. Alternatively, utilization metrics 114 may be estimated (e.g., extrapolated) based on historical use trends (e.g., peak periods of use and minimal periods of use) to reflect an estimated level of system resource usage at a future point in time.

Though utilization metrics 114 may vary depending upon the characteristics of the server machine 112 being monitored, example utilization metrics 114 may include system level metrics (e.g., clustered environment and virtualized environment) as well as applications level metrics. For example, utilization metrics 114 may include memory utilization metrics, such as paging metrics, swapping metrics, and available memory metrics. As another example, utilization metrics 114 may include CPU utilization metrics at the particular server machine 112. For the sake of explanatory clarity, a nonlimiting list of example utilization metrics 114 that may be used to monitor the activity level of a server machine 112 follows at the end of the specification.

Depending upon the design of system 100, the utilization metrics 114 chosen to gauge the activity level of each server machine 112 may be specified by a user, specified by brokering engine 106, or both. As an example and not by way of limitation, when a user submits a job 104 to brokering engine 106, the user may specify that memory usage should be used as the relevant utilization metric 114 to gauge the activity level of each server machine 112. Depending upon the design of system 100, the user may further specify a mathematical formula for determining a customized utilization value 115 derived from a plurality of user-specified utilization metrics 114.

In particular embodiments, brokering engine 106 may use one or more default utilizations metrics 114 (e.g., CPU usage, Memory usage, or an overall utilization metric) to gauge the activity level of each server machine 112. Furthermore, brokering engine 106 may supply a default formula for determining a utilization value 115 of the default utilization metrics 114. Utilization value 115 may be a single numeric value between 0 and 1 that represents a level of activity of a server machine 112. As an example and not by way of limitation, a value of "1" may indicate that server machine 112 is being used at maximum capacity and a value of "0" may indicate that server machine 112 is not being used at all. Thus, utilization value 115 may be a normalized value. A system and method for creating an example utilization value 115 that may be adapted for use in particular embodiments of the present disclosure is described in co-pending and commonly assigned U.S. patent application Ser. No. 12/123,885 entitled, "System and Method for Determining Overall Utilization." One of ordinary skill in the art will appreciate that the above-described utilization metrics 114 were presented for the sake of explanatory simplicity and will further appreciate that the present disclosure contemplates the use of any suitable metric(s) to describe the current activity level of a server machine 112.

Depending upon the design of system 100, brokering engine 106 may receive utilization metrics 114 from all of the server machines 112 in active pool 110 at regular intervals (e.g., on a regular polling cycle) so that brokering engine 106 has such information immediately available at the time a job 104 is submitted. Alternatively, brokering engine 106 may gather utilization metrics 114 from server machines 112 after job 104 has been submitted, for example, to conserve system resources. Brokering agent 106 may receive utilization metrics 114, for example, from a collection agent residing on each server machine 112, though one of skill in the art will appreciate that any suitable means of collection may be used. As an example and not by way of limitation, utilization metrics 114 could also be collected by a system management program such as UNICENTER NETWORK AND SYSTEMS MANAGEMENT SYSTEMS PERFORMANCE OPTION r3.0 ("NSM SPO") produced by CA, Inc. In any case, brokering engine 106 may use utilization metrics 114 to determine level of activity of each server machine 112, for example, expressed as utilization value 115.

Once brokering engine 106 has determined satisfaction values 107 and a utilization value 115 for each server machine 112, brokering engine 106 may enter satisfaction values 107 and utilization value 115 for each server machine 112 into a performance formula which outputs a single overall suitability value 109 for each server machine 112. Overall suitability value 109 may represent a numeric degree to which a server machine 112 is suitable for performing job 104, for example, in light of its operational characteristics and usage level.

In particular embodiments, the performance equation used to aggregate satisfaction values 107 and utilization value 115 into overall suitability value 109 may be a collection of weighted arguments, each weighted argument including a weighted value that determines its relative mathematical weight. Depending upon the design of system 100, the weighted values may be specified by a user, for example, to enable the user to define the relative importance of each weighted argument in determining overall suitability value 109. As an example and not by way of limitation, overall suitability value 109 may be derived using the following example formula: (overall suitability value)=w*(utilization value)+x*(software compatibility value)+y*(resource availability value)+z*(system resource compatibility value) where w, x, y, and z are weighted values that may be specified by a user. Once brokering engine 106 has determined an overall suitability value 109 for each server machine 112 in active pool 110, brokering engine 106 may identify the most suitable resource for performing the job resource, for example, by identifying the server machine 112 having the highest overall suitability value 109.

Figure 2:
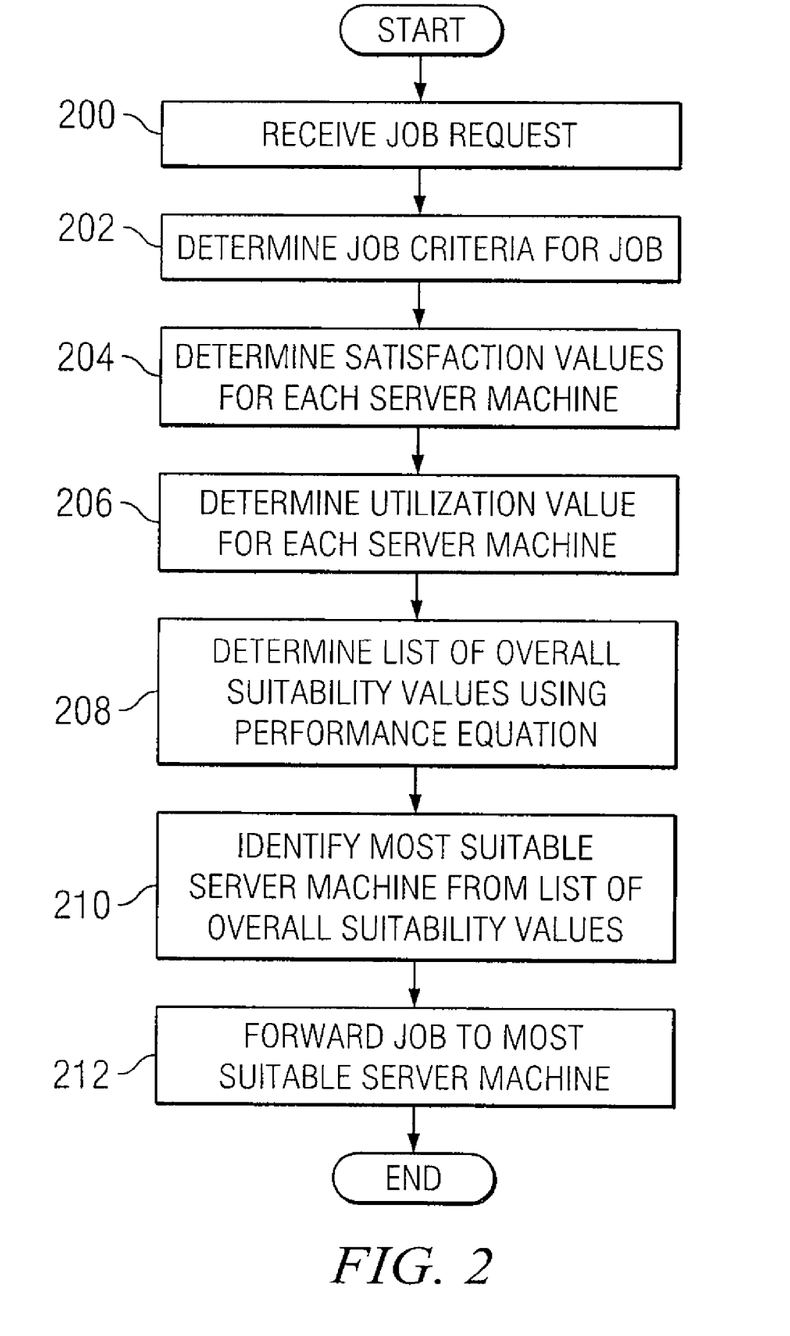
FIG. 2 illustrates an example method for efficient machine selection for job provisioning according to an example embodiment of the present disclosure.

FIG. 2 illustrates an example method for dynamic resource provisioning for job submission according to an example embodiment of the present disclosure. The method begins at step 200 where brokering agent 106 receives a job 104 from client machine 102. The method continues at step 202 where brokering agent 106 determines one or more job criteria 105 associated with job 104. Continuing to step 204, brokering engine 106 compares the operational characteristics of each of the server machines 112 in pool 110 against job criteria 105 and creates a set of satisfaction factors 107 for each server machine 112. At step 206, brokering engine 106 determines a utilization value 115 for each server machine 112. The method continues at step 208 where brokering engine 106 determines an overall suitability value 109 for each server machine 112 by entering each server machine 112's satisfaction values 107 and utilization value 105 into a performance equation. As mentioned above, in particular embodiments, the performance equation may include one or more weighted arguments having user-specified weighted values. Brokering engine may then create a list of overall suitability values 109 representing the server machines 112 in active pool 110. At step 210, brokering engine 106 may identify to client machine 102 the most suitable server machine 112 for performing job 104 from the list of overall suitability values 109, and at step 212, client machine 102 may forward job 104 to that server machine 112 for execution, after which, the method ends.

As mentioned above with respect to FIG. 1, example utilization metrics 114 may include metrics such as those listed in TABLE 1 below.

TABLE 1

| Platform | Metric | Description |
|---|---|---|
| Microsoft Windows | Physical disk: Disk Read Bytes per second | The rate which data is read from the physical disk. |
| Windows | Physical disk: Disk Write Bytes per second | The rate which data is written to the physical disk. |
| Windows | Physical disk: Percentage Disk Time | The percentage of elapsed time that the disk drive is busy servicing read or write requests. |
| Windows | Percentage Processor Time | The percentage of elapsed time that the processor spends running a non-idle thread. |
| Windows | Memory: Available MB | The amount of physical memory in megabytes available to processes running on the computer. |
| Windows | Memory: Pages per Second | The rate at which pages are read from or written to the disk to resolve hard page faults. |
| Windows | Memory: Percentage Committed Bytes in Use | The percentage of total possible physical memory in use for which space has been reserved in the paging file if it needs to be written to the disk. |
| Windows | Network Interface: Bytes Total per Second | The rate at which bytes are sent and received over each network adapter including message framing characters. |
| Windows | Network Interface: Current Bandwidth | The estimated current bandwidth of the network interface in bits per second. For example, 10000 represents 10 Mbps. |
| Windows | Network Interface: Packets per Second | The rate at which packets are sent and received on the network interface. |
| Windows Microsoft Cluster Server "MSCS" Cluster | Uptime Percentage | The percentage of time a cluster has been evaluated as being in an "Up" state. |
| Windows MSCS Node | Uptime Percentage | The percentage of time a cluster node has been evaluated as being in an in an "Up" state. |
| Windows MSCS Resource Group | Uptime Percentage | The percentage of time a cluster resource group has been evaluated as being in an in an "Up" state. |
| Windows MSCS Resource | Uptime Percentage | The percentage of time a cluster resource has been evaluated as being in an in an "Up" state. |
| Windows MSCS Network Interface | Uptime Percentage | The percentage of time a cluster network interface has been evaluated as being in an in an "Up" state. |
| Windows MSCS Network | Uptime Percentage | The percentage of time a cluster network has been evaluated as being in an in an "Up" state. |
| Windows Veritas Cluster | Uptime Percentage | The percentage of time a cluster has been evaluated as being in an in an "Up" state. |
| Windows Veritas Cluster Node | Uptime Percentage | The percentage of time a cluster node has been evaluated as being in an in an "Up" state. |
| Windows Veritas Cluster Service Group | Uptime Percentage | The percentage of time a cluster service group has been evaluated as being in an in an "Up" state. |
| Windows Veritas Cluster Resource | Uptime Percentage | The percentage of time a cluster resource has been evaluated as being in an in an "Up" state. |
| Linux | CPU Group: Total Usage Percentage User | The percentage of elapsed time that the process spends to run user instructions. |
| Linux | CPU Group: Total Usage Percentage System | The percentage of elapsed time that the processor spends to run operating system instructions. |
| Linux | CPU Group: Load Average Fifteen | The fifteen minute load average. |
| Linux | Disk Group: Bytes per Second | The rate which data is read from and written to the physical disk. |
| Linux | Disk Group: Reads per Second | The rate which data is read from the physical disk. |
| Linux | Disk Group: Writes per Second | The rate which data is written to the physical disk. |
| Linux | Network Group: TCP Operations Packets Received per Second | The rate at which the network interface is receiving packets. |
| Linux | Network Group: TCP Operations Packets Sent per Second | The rate at which the network interface is sending packets. |

TABLE 1-continued

| Platform | Metric | Description |
| --- | --- | --- |
| Linux | File System Group: Free Space | Available storage space in the file system in kilobytes. |
| Linux | File System Group: Used Space | Used storage space in the file system in kilobytes. |
| Sun Solaris Veritas Cluster | Uptime Percentage | The percentage of time a cluster has been evaluated as being in an in an "Up" state. |
| Sun Solaris Veritas Cluster Node | Uptime Percentage | The percentage of time a cluster node has been evaluated as being in an in an "Up" state. |
| Sun Solaris Veritas Cluster Service Group | Uptime Percentage | The percentage of time a cluster service group has been evaluated as being in an in an "Up" state. |
| Sun Solaris Veritas Cluster Resource | Uptime Percentage | The percentage of time a cluster resource has been evaluated as being in an in an "Up" state. |
| Solaris | CPU Group: Total Usage Percentage User | The percentage of elapsed time that the process spends to run user instructions. |
| Solaris | CPU Group: Total Usage Percentage System | the percentage of elapsed time that the processor spends to run operating system instructions. |
| Solaris | CPU Group: Load Average Fifteen | The fifteen minute load average. |
| Solaris | Disk Group: Bytes per Second | The rate which data is read from and written to the physical disk. |
| Solaris | Disk Group: Reads per Second | The rate which data is read from the physical disk. |
| Solaris | Disk Group: Writes per Second | The rate which data is written to the physical disk. |
| Solaris | Network Group: TCP Operations Packets Received per Second | The rate at which the network interface is receiving packets. |
| Solaris | Network Group: TCP Operations Packets Sent per Second | The rate at which the network interface is sending packets. |
| Solaris | File System Group: Free Space | Available storage space in the file system in kilobytes. |
| Solaris | File System Group: Used Space | Used storage space in the file system in kilobytes. |
| VMware ESX Server | VMware ESX 3.0 Server Disk: KB Read per Second | The number of kilobytes read from the disk per second. |
| VMware ESX Server | VMware ESX 3.0 Server Disk: KB Written per Second | The number of kilobytes written to the disk per second. |
| VMware ESX Server | VMware ESX 3.0 VM CPU: CPU Usage (percentage) | The percentage of elapsed time that the processor uses to run the virtual machine. |
| VMware ESX Server | VMware ESX 3.0 VM Memory: Memory Usage (percentage) | The percentage of the total amount of physical memory used by the virtual machine. |
| VMware ESX Server | VMware ESX 3.0 VM Memory: Available Memory (KB) | The amount of memory available for use by the virtual machine in kilobytes. |
| VMware ESX Server | VMware ESX 3.0 VM Disk: KB Read per Second | The number of kilobytes read from the virtual machine disk per second. |
| VMware ESX Server | VMware ESX 3.0 VM Disk: KB Written per Second | The number of kilobytes written to the virtual machine disk per second. |
| VMware ESX Server | VMware ESX 3.0 VM Network: KB Transmitted per Second | The number of kilobytes transmitted (total amount of data sent and received) by the virtual machine over the network per second. |
| VMware ESX Server | VMware ESX 3.0 VM Network: KB Received per Second | The number of kilobytes received by the virtual machine over the network per second. |
| IBM AIX | Memory Group: Percentage Free Physical Memory | The percentage of physical memory free on the system. |
| IBM AIX | CPU: Percentage Total | The total percentage of CPU utilization on the system. |
| IBM AIX | CPU Group: Total Usage Percentage User | Total CPU utilization due to user activity on the system. |
| IBM AIX | CPU Group: Total Usage Percentage System | Total CPU utilization due to OS activity on the system. |

TABLE 1-continued

| Platform | Metric | Description |
|---|---|---|
| IBM AIX | CPU Group: Load Averages Fifteen | The fifteen minute load-average of the system. |
| IBM AIX | Disk Group: Bytes per Second | The number of bytes read and written per second by the disk. |
| IBM AIX | Disk Group: Reads per Second (average) | The average number of reads per second by the disk. |
| IBM AIX | Disk Group: Writes per Second (average) | The average number of writes per second by the disk. |
| IBM AIX | Network Group: TCP Operations Packets Received per Second | The number of packets received per second by the network adapter. |
| IBM AIX | Network Group: TCP Operations Packets Sent per Second | The number of packets sent per second by the network adapter. |
| IBM AIX | File System Group: Free Space | Amount of free space (in bytes) of the file system. |
| IBM AIX | File System Group: Used Space | Amount of used space (in bytes) of the file system. |
| IBM AIX | CPU Group: Total Usage Percentage Idle | The percentage of CPU used by the system idle process. |
| HP UNIX | Memory Group: Percentage Free Physical Memory | The percentage of physical memory free on the system. |
| HP UNIX | CPU: Percentage Total | The total percentage of CPU utilization on the system. |
| HP UNIX | CPU Group: Total Usage Percentage User | Total CPU utilization due to user activity on the system. |
| HP UNIX | CPU Group: Total Usage Percentage System | Total CPU utilization due to OS activity on the system. |
| HP UNIX | CPU Group: Load Averages Fifteen | The fifteen minute load-average of the system. |
| HP UNIX | CA Disk Group: Bytes per Second | The number of bytes read and written per second by the disk. |
| HP UNIX | Disk Group: Reads per Second (average) | The average number of reads per second by the disk. |
| HP UNIX | Disk Group: Writes per Second (average) | The average number of writes per second by the disk. |
| HP UNIX | Network Group: TCP Operations Packets Received per Second | The number of packets received per second by the network adapter. |
| HP UNIX | Network Group: TCP Operations Packets Sent per Second | The number of packets sent per second by the network adapter. |
| HP UNIX | File System Group: Free Space | Amount of free space (in bytes) of the file system. |
| HP UNIX | File System Group: Used Space | Amount of used space (in bytes) of the file system. |
| HP UNIX | CPU Group: Total Usage Percentage Idle | The percentage of CPU used by the system idle process. |
| Windows | Agent Stats: Metric Count | Total number of metrics of an Introscope agent collects |
| Windows | Backends: Average Response Time (ms) | Average milliseconds taken for a backend component to respond to a request |
| Windows | Backends: Errors Per Interval | Number of backend errors per poll interval |
| Windows | Backends: Stall Count | Number of times the backend invocation has been stalled |
| Windows | Frontends: Average Response Time (ms) | Average number of milliseconds taken for a frontend component to respond to a request |
| Windows | Frontends: Errors Per Interval | Number of frontend errors per poll interval |
| Windows | Frontends: Stall Count | Number of times the frontend invocation has been stalled |
| Windows | Frontends: Connection Count | Number of open connections to a frontend component |
| Windows | CPU: Utilization % (aggregate) | Aggregate % CPU utilization |
| Windows | CPU: Utilization % (process) | Application's % CPU utilization |
| Windows | GC Heap: Bytes Total | Total JVM heap size in bytes |
| Windows | GC Heap: Bytes In Use | Bytes in use by JVM |

TABLE 1-continued

| Platform | Metric | Description |
|---|---|---|
| Windows | EJB: Average Response Time (ms) | Average number of milliseconds taken for an EJB component to respond to a request |
| Windows | EJB: Errors Per Interval | Number of EJB errors per poll interval |
| Windows | EJB: Stall Count | Number of times the EJB invocation has been stalled |
| Windows | JSP: Average Response Time (ms) | Average number of milliseconds taken for an JSP component to respond to a request |
| Windows | JSP: Responses Per Interval | Number of responses per poll interval for a JSP component |
| Windows | JSP: Errors Per Interval | Number of JSP errors per poll interval |
| Windows | JSP: Stall Count | Number of times the JSP invocation has been stalled |
| Windows | Servlets: Average Response Time (ms) | Average number of milliseconds taken for an Servlet to respond to a request |
| Windows | Servlets: Responses Per Interval | Number of responses per poll interval for a Servlet component |
| Windows | Servlets: Errors Per Interval | Number of Servlet errors per poll interval |
| Windows | Servlets: Stall Count | Number of times the Servlet invocation has been stalled |
| Windows | Sockets: Opens Per Interval | Number of sockets opened per poll interval |
| Windows | Sockets: Closes Per Interval | Number of sockets closed per poll interval |
| Windows | Sockets: Accepts Per Interval | Number of socket accepts per poll interval |

Although the present disclosure has been described in several embodiments, a myriad of changes, substitutions, and modifications may be suggested to one skilled in the art, and it is intended that the present disclosure encompass such changes, substitutions, and modifications as fall within the scope of the present appended claims.

What is claimed is:

1. A method for efficient machine selection for job provisioning, comprising:
receiving a job request to perform a job using an unspecified server machine; from the job request, determining, by a processor, one or more job criteria needed to perform the job; providing a list of one or more server machines, the one or more server machines potentially operable to perform the job;
for each server machine on the list of one or more server machines: determining a utilization value, the utilization value comprising a numeric level of activity for the each server machine; determining one or more job criteria satisfaction values, each of the one or more job criteria satisfaction values comprising a numeric degree to which the each server machine satisfies one of the one or more job criteria; determining an overall suitability value from the one or more job criteria satisfaction values and the utilization value, the overall suitability value comprising a numeric degree to which the each server machine is suitable for performing the job, wherein determining the overall suitability value from the one or more job criteria satisfaction values and the utilization value comprises, for the each server machine, entering the one or more job criteria satisfaction values and the utilization value into a performance equation wherein the result of the performance equation comprises the overall suitability value for the each server machine, wherein the performance equation comprises one or more weighted arguments, each of the one or more weighted arguments corresponding to one of the one or more job criteria satisfaction values and the utilization value, and wherein the performance equation is expressed as (overall suitability value)=w*(utilization value)+x*(software compatibility value)+y*(server machine availability value)+z*(system resource compatibility value) wherein w, x, y, and z comprise weighted values; and including the overall suitability value on a list of one or more overall suitability values; and determining a most suitable server machine for performing the job from the list of one or more overall suitability values.

2. The method of claim 1, further comprising forwarding the job to the most suitable server machine.

3. The method of claim 1, wherein determining a most suitable server machine for performing the job from the list of one or more overall suitability values comprises identifying a server machine having a highest suitability value on the list of suitability values.

4. The method of claim 1, wherein the one or more job criteria comprise: a type of software needed to perform the job; a threshold amount of system resources needed to perform the job; and an amount of time for which the threshold amount of system resources are needed to perform the job.

5. The method of claim 4, wherein determining one or more job criteria satisfaction values comprises, for the each server machine:
determining a software compatibility value, the software compatibility value comprising a numeric degree of compatibility between a type software included on the each server machine and the type of software needed to perform the job;
determining a server machine availability value, the server machine availability value comprising a numeric degree to which the each server machine has the threshold amount of system resources available to perform the job for the amount of time needed to perform the job; and determining a system resource compatibility value, the system resource compatibility value comprising a numeric degree of compatibility between available system resources on the each server machine and the threshold amount of system resources needed to perform the job.

6. The method of claim 1, further comprising: enabling a user to specify a weighted value for each of the one or more weighted arguments, the weighted value determining a mathematical weight for the each of the one or more weighted arguments.

7. The method of claim 1, wherein at least one of the one or more of the job criteria are specified by a user.

8. The method of claim 1, wherein determining the utilization value comprises extrapolating the utilization value from historical usage data from the each server machine to determine an estimated level of activity at a future point in time.

9. A system for efficient machine selection for job provisioning, comprising a server including one or more processors coupled to a memory, the server comprising: an interface operable to: receive a job request to perform a job using an unspecified server machine; a brokering engine operable to: from the job request, determine one or more job criteria needed to perform the job; provide a list of one or more server machines, the one or more server machine potentially operable to perform the job; for each server machine on the list of one or more server machines: determine a utilization value, the utilization value comprising a numeric level of activity for the each server machine; determine one or more job criteria satisfaction values, each of the one or more job criteria satisfaction values comprising a numeric degree to which the each server machine satisfies one of the one or more job criteria; determine an overall suitability value from the one or more job criteria satisfaction values and the utilization value, the overall suitability value comprising a numeric degree to which the each server machine is suitable for performing the job, wherein determining the overall suitability value from the one or more job criteria satisfaction values and the utilization value comprises, for the each server machine, entering the one or more job criteria satisfaction values and the utilization value into a performance equation wherein the result of the performance equation comprises the overall suitability value for the each server machine, wherein the performance equation comprises one or more weighted arguments, each of the one or more weighted arguments corresponding to one of the one or more job criteria satisfaction values and the utilization value, and wherein the performance equation is expressed as (overall suitability value)=w*(utilization value)+x*(software compatibility value)+y*(server machine availability value)+z*(system resource compatibility value) wherein w, x, y, and z comprise weighted values; and include the overall suitability value on a list of one or more overall suitability values; and determine a most suitable server machine for performing the job from the list of one or more overall suitability values.

10. The system of claim 9, wherein the one or more job criteria comprise: a type of software needed to perform the job; a threshold amount of system resources needed to perform the job; and an amount of time for which the threshold amount of system resources are needed to perform the job.

11. The system of claim 10, wherein the brokering agent is operable to determine one or more job criteria satisfaction values by, for the each server machine:

determining a software compatibility value, the software compatibility value comprising a numeric degree of compatibility between a type software included on the each server machine and the type of software needed to perform the job;

determining a server machine availability value, the server machine availability value comprising a numeric degree to which the each server machine has the threshold amount of system resources available to perform the job for the amount of time needed to perform the job; and determining a system resource compatibility value, the system resource compatibility value comprising a numeric degree of compatibility between available system resources on the each server machine and the threshold amount of system resources needed to perform the job.

12. The system of claim 9, wherein the brokering engine is further operable to: enable a user to specify a weighted value for each of the one or more weighted arguments, the weighted value determining a mathematical weight for the each of the one or more weighted arguments.

13. A Non-transitory computer readable media encoded with logic for efficient machine selection for job provisioning that, when executed by a computer including one or more processors and a memory, instructs the computer to perform processes comprising: receiving a job request to perform a job using an unspecified server machine; from the job request, determining one or more job criteria needed to perform the job; providing a list of one or more server machines, the one or more server machines potentially operable to perform the job; for each server machine on the list of one or more server machines: determining a utilization value, the utilization value comprising a numeric level of activity for the each server machine; determining one or more job criteria satisfaction values, each of the one or more job criteria satisfaction values comprising a numeric degree to which the each server machine satisfies one of the one or more job criteria; determining an overall suitability value from the one or more job criteria satisfaction values and the utilization value, the overall suitability value comprising a numeric degree to which the each server machine is suitable for performing the job, wherein determining the overall suitability value from the one or more job criteria satisfaction values and the utilization value comprises, for the each server machine, entering the one or more job criteria satisfaction values and the utilization value into a performance equation wherein the result of the performance equation comprises the overall suitability value for the each server machine, wherein the performance equation comprises one or more weighted arguments, each of the one or more weighted arguments corresponding to one of the one or more job criteria satisfaction values and the utilization value, and wherein the performance equation is expressed as (overall suitability value)=w*(utilization value)+x*(software compatibility value)+y*(server machine availability value)+z*(system resource compatibility value) wherein w, x, y, and z comprise weighted values; and including the overall suitability value on a list of one or more overall suitability values; and determining a most suitable server machine for performing the job from the list of one or more overall suitability values.

14. The non-transitory, computer readable media of claim 13, wherein the one or more job criteria comprise: a type of software needed to perform the job;

a threshold amount of system resources needed to perform the job; and an amount of time for which the threshold amount of system resources are needed to perform the job.

15. The non-transitory, computer readable media of claim 14, wherein determining one or more job criteria satisfaction values comprises, for the each server machine: determining a software compatibility value, the software compatibility value comprising a numeric degree of compatibility between a type software included on the each server machine and the type of software needed to perform the job; determining a server machine availability value, the server machine availability value comprising a numeric degree to which the each server machine has the threshold amount of system resources available to perform the job for the amount of time needed to perform the job; and determining a system resource compatibility value, the system resource compatibility value comprising a numeric degree of compatibility between available system resources on the each server machine and the threshold amount of system resources needed to perform the job.

16. The non-transitory, computer readable media of claim 13, wherein the and logic, when executed by the computer, instructs the computer to perform processes further comprising: enabling a user to specify a weighted value for each of the one or more weighted arguments, the weighted value determining a mathematical weight for the each of the one or more weighted arguments.

* * * * *